US012623598B2

(12) United States Patent
Alomari et al.

(10) Patent No.: US 12,623,598 B2
(45) Date of Patent: May 12, 2026

(54) ALERT SYSTEM AND METHOD TO ALERT DRIVER OF VEHICLE

(71) Applicant: IMAM ABDULRAHMAN BIN FAISAL UNIVERSITY, Dammam (SA)

(72) Inventors: Abdul-Hakeem Hussein Alomari, Dammam (SA); Lola El Sahmarany, Dammam (SA); Abdul Hameed Sulaiman Almojil, Dammam (SA); Haifa Ahmed Khalifa, Dammam (SA); Shahad Hani Alomair, Dammam (SA); Doaa Mohammed Abu Aladas, Dammam (SA)

(73) Assignee: IMAM ABDULRAHMAN BIN FAISAL UNIVERSITY, Dammam (SA)

( * ) Notice: Subject to any disclaimer, the term of this patent is extended or adjusted under 35 U.S.C. 154(b) by 57 days.

(21) Appl. No.: 18/887,486

(22) Filed: Sep. 17, 2024

(65) Prior Publication Data

US 2026/0077712 A1 Mar. 19, 2026

(51) Int. Cl.
B60Q 1/00 (2006.01)
B60Q 9/00 (2006.01)
B62D 1/06 (2006.01)

(52) U.S. Cl.
CPC ..................................... B60Q 9/00 (2013.01); B62D 1/06 (2013.01)

(58) Field of Classification Search
CPC ..................................... B60Q 9/00; B62D 1/06
See application file for complete search history.

(56) References Cited

U.S. PATENT DOCUMENTS

| | | | | |
|---|---|---|---|---|
| 5,793,292 A | * | 8/1998 | Ivey, Jr. ................. | G08B 21/06 340/576 |
| 8,983,732 B2 | * | 3/2015 | Lisseman ............. | B60K 28/066 701/45 |
| 9,180,812 B2 | * | 11/2015 | Colvin, Sr. ............ | B62D 1/046 |

(Continued)

FOREIGN PATENT DOCUMENTS

| | | |
|---|---|---|
| CN | 110403617 A | 11/2019 |
| KR | 10-2011-0069992 A | 6/2011 |
| WO | 85/00785 A1 | 2/1985 |

*Primary Examiner* — Toan N Pham
(74) *Attorney, Agent, or Firm* — Oblon, McClelland, Maier & Neustadt, L.L.P.

(57) ABSTRACT

A system and method to alert a driver of a vehicle as a safety system for vehicle includes a force sensing resistor and a galvanic skin response sensor coupled to the steering wheel, and an alarm notification module. The alert system further includes a processing unit with a circuitry including instructions to receive initial conductance data and real-time conductance data from the galvanic skin response sensor, and real-time force data from the force sensing resistor; generate a mean data from the initial conductance data; apply an averaging filter to the real-time conductance data to generate filtered real-time conductance data; generate a first comparison between the real-time force data and a predefined threshold; generate a second comparison between the filtered real-time conductance data and the mean data; and activate the alarm notification module of the vehicle based on at least one of the first comparison and the second comparison.

17 Claims, 8 Drawing Sheets

(56)     References Cited

U.S. PATENT DOCUMENTS

| 2003/0141978 | A1  | 7/2003  | D'Agosto |
| 2014/0077957 | A1* | 3/2014  | Bichara ................. G08B 21/06 |
|              |     |         | 340/575 |
| 2016/0039424 | A1  | 2/2016  | Hong et al. |
| 2023/0322157 | A1* | 10/2023 | Krishevski .......... B60Q 1/0082 |
|              |     |         | 340/439 |
| 2024/0087430 | A1* | 3/2024  | Berry-Jones ............. B60Q 9/00 |

\* cited by examiner

600

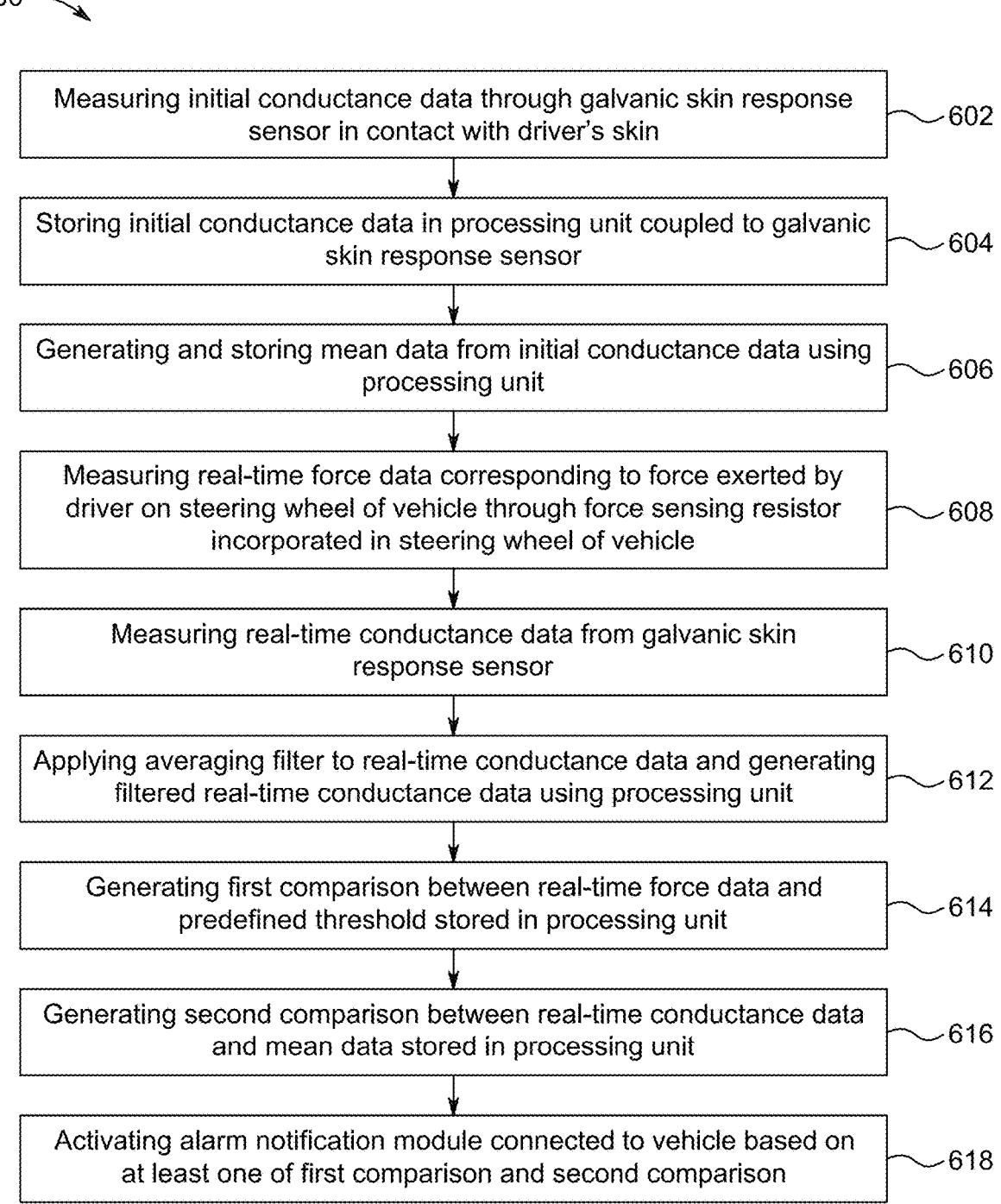

| | |
|---|---|
| Measuring initial conductance data through galvanic skin response sensor in contact with driver's skin | 602 |
| Storing initial conductance data in processing unit coupled to galvanic skin response sensor | 604 |
| Generating and storing mean data from initial conductance data using processing unit | 606 |
| Measuring real-time force data corresponding to force exerted by driver on steering wheel of vehicle through force sensing resistor incorporated in steering wheel of vehicle | 608 |
| Measuring real-time conductance data from galvanic skin response sensor | 610 |
| Applying averaging filter to real-time conductance data and generating filtered real-time conductance data using processing unit | 612 |
| Generating first comparison between real-time force data and predefined threshold stored in processing unit | 614 |
| Generating second comparison between real-time conductance data and mean data stored in processing unit | 616 |
| Activating alarm notification module connected to vehicle based on at least one of first comparison and second comparison | 618 |

ALERT SYSTEM AND METHOD TO ALERT DRIVER OF VEHICLE

STATEMENT OF ACKNOWLEDGEMENT

Support provided by Traffic Safety Chair, Saudi Aramco, Dhahran, Saudi Arabia, through funding project #4034 is gratefully acknowledged.

BACKGROUND

Technical Field

The present disclosure is directed to a vehicle safety system, and more specifically to a system and method for continuous or intermittent monitoring and alerting the driver of a vehicle based on physiological and physical data of the driver.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The development and implementation of safety systems for vehicles have been a focus in the automotive industry to address the high potential for accidents. Traditional safety systems for vehicles have predominantly revolved around passive safety features, such as seat belts and airbags, designed to protect occupants in the event of a crash. New technology in the automotive sector relating to safety systems such as Anti-lock Braking Systems (ABS) and Electronic Stability Control (ESC), works to actively prevent accidents. In recent years, the focus has shifted towards advanced driver-assistance systems (ADAS), which use a combination of technologies like sensors, cameras, and radar to monitor the vehicle's environment and assist the driver in navigating more safely.

Despite these advancements, a critical aspect of vehicular safety remains, i.e., monitoring driver alertness and responsiveness to potentially hazardous situations. Most current systems lack the capability to effectively gauge the driver's physiological state, which is a key indicator of the driver's ability to react to road conditions and control the vehicle safely. Factors such as fatigue, drowsiness, and distraction significantly contribute to road accidents. Current technologies primarily focus on external factors and vehicle dynamics, often overlooking the human (driver) element. The failure to accurately monitor and respond to the driver's state can lead to delayed reactions or inappropriate responses from the vehicle's safety systems, resulting in accidents that could have been prevented.

In response to the need for enhanced driver monitoring, some solutions have been developed. For instance, US 20160039424A1 describes a wearable device including a main body configured to be worn on a user's body, a sensing unit that senses a biological signal of a user, a storage unit for collecting log information, and a controller for setting a reference driving index. This device outputs feedback including the state of the user based on the biological signal sensed before and after getting in a vehicle. However, this publication does not mention integration of the safety system with the steering wheel of vehicle, nor does it utilize a force sensing resistor or a galvanic skin response sensor for real-time monitoring, focusing instead on wearable technology for sensing and logging biological signals.

CN110403617A describes a system for monitoring the state of mind of a driver through skin electric signals and pressure distribution signals acquired at the driver's palm on the steering wheel. The system judges the driver's state of mind and provides mood-relieving adjustments. However, this publication does not utilize a force sensing resistor or a galvanic skin response sensor for real-time monitoring, focusing instead on the acquisition of skin electric signals and pressure distribution for mood and state of mind assessment.

KR 20110069992A describes a system for drowsiness detection using an operator's driving patterns and handle grip pressure. The system includes a driving pattern detecting part, a handle grip pressure detection part, and a central control part for sensing sleepiness and controlling a warning device. However, this reference does not mention combining physiological data such as skin conductance with physical force data from a steering wheel, focusing instead on the operator's driving pattern and handle grip pressure for sleepiness detection.

US 20030141978A1 describes a monitoring arrangement for detecting a sleeping driver using a load cell connected to electronic scales. This system establishes a baseline force value when the driver grasps the steering wheel and sounds an alarm if the grip falls below this value. However, this publication does not mention integration of a galvanic skin response sensor or processing real-time physiological and physical data to alert a driver of the vehicle, focusing instead on the detection of sleepiness through changes in steering wheel grip force.

WIPO publication 1985000785A1 describes a method for monitoring attention by tracking volar skin resistance, using a pair of electrodes attached to the hand. An increase in resistance triggers an alert to enhance concentration. However, this reference does not mention integration with steering wheel of vehicle, nor does it combine this approach with force sensing data to alert a driver of the vehicle, focusing instead on volar skin resistance as a key indicator of attention levels.

Each of the aforementioned references have one or more drawbacks hindering their adoption in vehicle safety systems. Accordingly, there is a need for system and/or method that detects and anticipates potential lapses in driver alertness. Such system and method may integrate physiological and physical monitoring mechanisms in addition to generating an alert for driver of a vehicle, offering a more holistic and personalized approach to overall safety of the driver and the vehicle. Moreover, such system and method may implement real-time data analysis, ensuring prompt detection of any deviations indicative of reduced alertness or stress, and thereby contributing to reducing accidents caused by driver inattention and improving overall road safety. The present disclosure provides an alert system for a driver of a vehicle that includes a force sensing resistor, a galvanic skin response sensor, an alarm notification module, and a processing unit that functions to monitor, analyze and/or determine a driver's alertness level.

SUMMARY

In an exemplary embodiment, an alert system for a driver of a vehicle is disclosed. The alert system comprises a force sensing resistor integrated into a steering wheel of the vehicle. The alert system also comprises a galvanic skin response sensor coupled to the steering wheel of the vehicle. The alert system further comprises an alarm notification module coupled to an interior console of the vehicle. The alert system further comprises a processing unit coupled to the force sensing resistor and coupled to the galvanic skin response sensor. Herein, the processing unit comprises a circuitry including instructions to receive initial conductance data from the galvanic skin response sensor; generate a mean data from the initial conductance data and store the mean data in a memory coupled to the circuitry; receive real-time force data from the force sensing resistor; receive real-time conductance data from the galvanic skin response sensor; apply an averaging filter to the real-time conductance data to generate filtered real-time conductance data; generate a first comparison between the real-time force data and a predefined threshold stored in the memory; generate a second comparison between the real-time conductance data and the mean data stored in the memory; and activate the alarm notification module of the vehicle based on at least one of the first comparison and the second comparison.

In some embodiments, the circuitry of the processing unit further includes instructions to activate the alarm notification module when real-time force data is less than the predefined threshold in the first comparison.

In some embodiments, the circuitry of the processing unit further includes instructions to activate the alarm notification module when a difference between the filtered real-time conductance data and the mean data is larger than a predefined difference value in the second comparison.

In some embodiments, the driver is in contact with the force sensing resistor and the galvanic skin response sensor.

In some embodiments, the galvanic skin response sensor is integrated into a pair of rings, wherein the pair of rings are coupled to the steering wheel of the vehicle.

In some embodiments, the pair of rings is positioned to provide a contact with the driver's skin as the driver is in contact with the steering wheel.

In some embodiments, the galvanic skin response sensor is integrated into a smart watch.

In some embodiments, the alarm notification module comprises a sound producing element.

In some embodiments, the activation of the alarm notification module comprises generating an audible alarm from the sound producing element.

In some embodiments, each of the real-time force data corresponds to a force exerted by the driver on the steering wheel of the vehicle.

In some embodiments, each of the initial conductance data and the real-time conductance data measured by the galvanic skin response sensor corresponds to an electrical conductance of the driver's skin.

In another exemplary embodiment, a method to alert a driver of a vehicle is disclosed. The method comprises measuring initial conductance data through a galvanic skin response sensor in contact with the driver's skin. The method further comprises storing the initial conductance data in a processing unit coupled to the galvanic skin response sensor. The method further comprises generating and storing a mean data from the initial conductance data using the processing unit. The method further comprises measuring real-time force data corresponding to force exerted by the driver on a steering wheel of the vehicle through a force sensing resistor incorporated in the steering wheel of the vehicle. The method further comprises measuring real-time conductance data from the galvanic skin response sensor. The method further comprises applying an averaging filter to the real-time conductance data and generating filtered real-time conductance data using the processing unit. The method further comprises generating a first comparison between the real-time force data and a predefined threshold stored in the processing unit. The method further comprises generating a second comparison between the real-time conductance data and the mean data stored in the processing unit. The method further comprises activating an alarm notification module connected to the vehicle based on at least one of the first comparison and the second comparison.

In some embodiments, activating the alarm notification module based on the first comparison corresponds to real-time force data being less than the predefined threshold.

In some embodiments, activating the alarm notification module based on the second comparison corresponds to a difference between the filtered real-time conductance data and the mean data being larger than a predefined difference value.

In some embodiments, the galvanic skin response sensor is integrated into a pair of rings, Herein, the pair of rings are coupled to the steering wheel of the vehicle.

In some embodiments, measuring each of the initial conductance data and the real-time conductance data using the galvanic skin response sensor corresponds to an electrical conductance of the driver's skin.

In some embodiments, an activation of the alarm notification module comprises generating an audible alarm from a sound producing element of the alarm notification module.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 6 is a flowchart listing steps involved in a method to alert the driver of the vehicle, according to certain embodiments;

DETAILED DESCRIPTION

Figure 1:
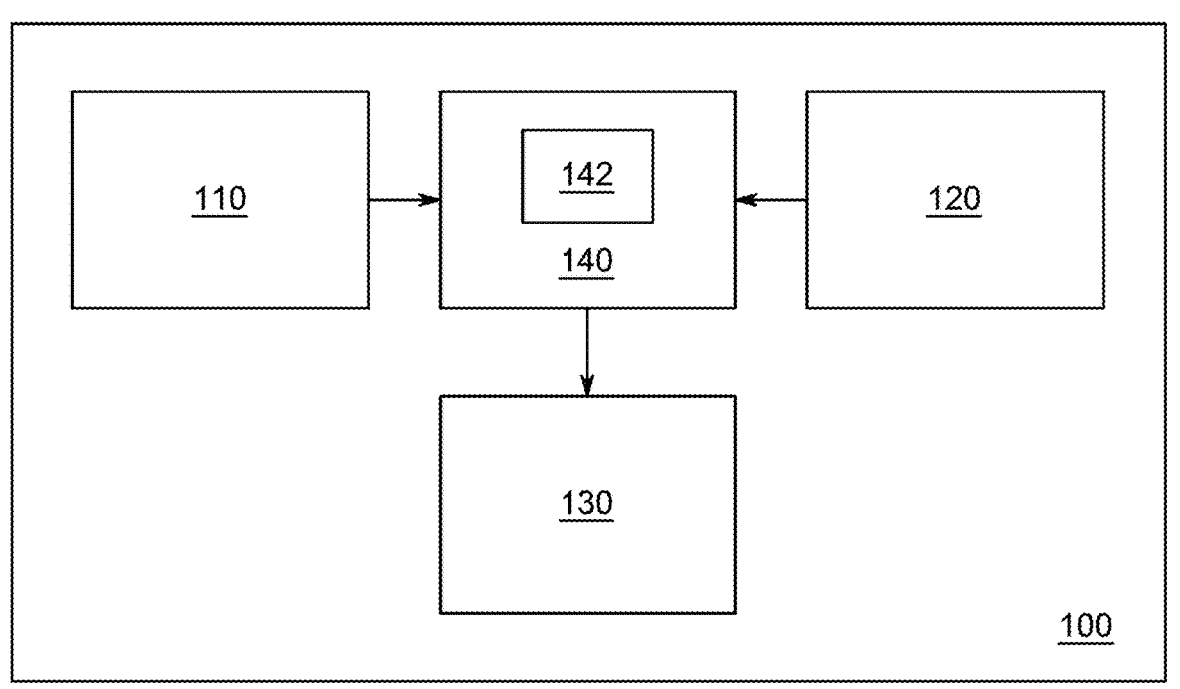
FIG. 1 is a schematic illustration of an alert system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to an alert system for a driver of a vehicle and a method to alert the driver of the vehicle based on physiological, biometric and/or physical data of the driver. The alert system of the present disclosure is configured to enhance the monitoring and response mechanisms pertaining to alertness and attention of the driver of the vehicle. The alert system provides a comprehensive approach to monitoring driver alertness, using both physiological and physical data for a more accurate assessment. In particular, the alert system is configured to continuously and/or intermittently assess physiological and physical parameters that are indicators of the driver's state, and provide accurate and timely assessments in preempting potential lapses in attention or alertness that could lead to hazardous situations on the road.

Figure 2:
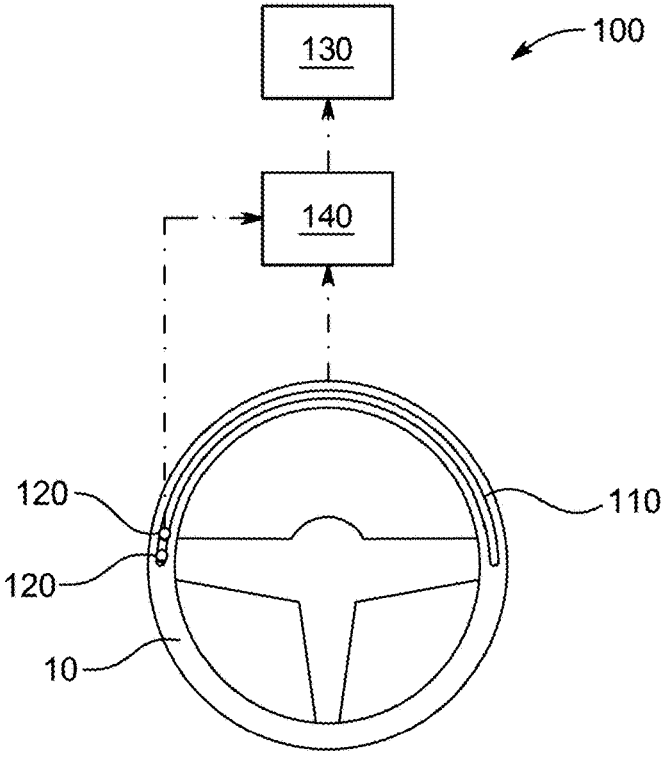
FIG. 2 is a diagrammatic view illustration of the alert system integrated into a steering wheel of a vehicle, according to certain embodiments.

Referring to FIG. 1, illustrated is a schematic of an alert system (represented by reference numeral 100). The alert system 100 of the present disclosure is designed to be integrated with a vehicle, working in conjunction with existing controls and interfaces thereof. Referring to FIG. 2, illustrated is a partial diagrammatic view of the alert system 100 integrated into a vehicle, with only a steering wheel 10 of the vehicle being shown for illustration purposes. In some examples, the alert system 100 may be designed to be an intrinsic part of the vehicle. In other examples, the alert system 100 may be retrofitted in the vehicle without departing from the scope and the spirit of the present disclosure. The integration of the alert system 100 with the vehicle allows it to respond appropriately to various driving scenarios, considering the driver's interaction with the vehicle, as discussed in the proceeding paragraphs in detail.

As illustrated in FIGS. 1-2, the alert system 100 includes a force sensing resistor 110 integrated into the steering wheel 10 of the vehicle. As used herein, the "force sensing resistor 110" refers to a component within the alert system 100, configured to measure a force applied by the driver onto the steering wheel 10 of the vehicle. The force sensing resistor 110 is a type of sensor that exhibits a change in its electrical resistance in response to the applied force, thereby enabling the quantification of the force exerted by the driver. Force sensing resistors are generally a resistive and/or piezoresistive sensing technology. This means they are passive elements that function as a variable resistor in an electrical circuit. When unloaded i.e., when no pressure or force is applied, the force sensing resistor has a high resistance (in the order of Megaohms (M$\Omega$)) that drops as force is applied (usually in the order of Kiloohms (K$\Omega$)). In the alert system 100, the force sensing resistor 110 is integrated into the steering wheel 10 in such a manner that it remains in constant contact with the driver's hands during vehicle operation. This configuration enables the force sensing resistor 110 to continuously monitor the physical state of the driver, providing force data for further analysis. The force sensing resistor 110 in the alert system 100 operates on the principle that its resistance decreases as the force applied to its surface increases. This characteristic makes it suitable for detecting and measuring variations in the grip strength or pressure applied by the driver on the steering wheel 10. It can be understood that the driver might be in an alert state when first handling the steering wheel 10 of the vehicle, exerting maximum pressure on the steering wheel. This causes a high resistance value of a force sensing resistor 110 integrated on an idle steering wheel 10 to decrease as the driver begins to drive the vehicle. Generally, force sensing resistors are not pre-calibrated to correlate a force reading to the pressure applied by the driver on the steering wheel 10. Due to a linear relationship between the resistance of the force sensing resistor and the pressure/force applied on it, with an initial observation of the force values corresponding to the force applied by the driver on the force sensing resistor 110 integrated steering wheel 10, the force sensing resistor 110 can be calibrated. Once calibrated, an observation of an increase in resistance of the force sensing resistor 110 can mean less pressure or force being applied on the steering wheel 10 by the driver, which can mean the driver is not in alert state. Monitoring the force value can be used to alert the driver using the alert system 100.

Force sensing resistors are generally of a semi-conductive material, or semi-conductive ink contained between two thin substrates, or a conductive polymer available as a polymer sheet or ink that can be applied by screen printing. Semi-conductive ink, conductive ink or conductive polymer ink include examples, such as, silver conductive ink including flake-based silver, or nanoparticle-based silver, carbon ink, Zink ink, and copper available as stretchable/thermoformable, and/or particle-free. Examples of semi-conductive material include pure elements, such as silicon or germanium, or compounds such as gallium arsenide or cadmium selenide. Examples of conductive polymers typically include polyacetylene (PA), polyaniline (PANI), polypyrrole (PPy), polythiophene (PTH), poly(para-phenylene) (PPP), poly(phenylenevinylene) (PPV), and polyfuran (PF). In addition to the conductive or the semi-conductive material, the force sensing resistors also include a wired or a wireless communication module to transmit recorded resistance data.

Figure 3A:
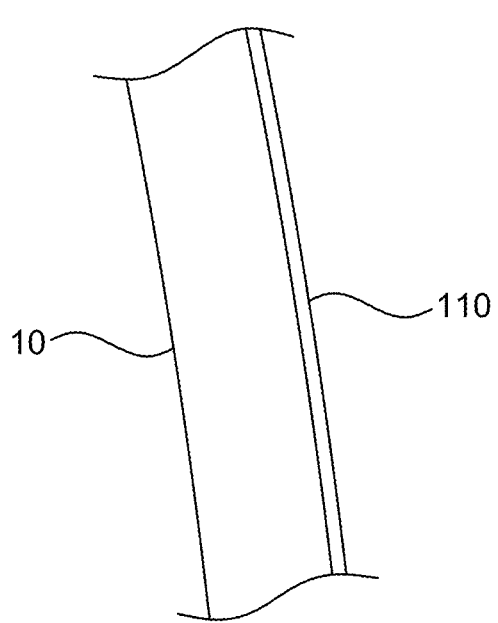
FIG. 3A is a partial diagrammatic view illustration of the steering wheel of the vehicle with a force sensing resistor of the alert system integrated therewith, according to certain embodiments.
Figure 3B:
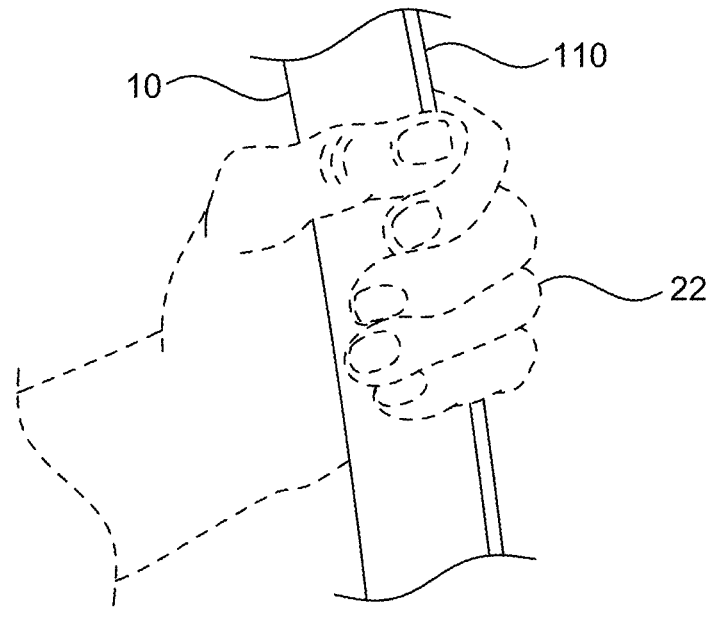
FIG. 3B is a depiction of implementation of the force sensing resistor of the alert system in operation of the vehicle, according to certain embodiments.

Referring to FIGS. 3A and 3B in combination, as may be seen, the force sensing resistor 110 is integrated into the steering wheel 10. In an example, the force sensing resistor 110 is configured as a strip, strategically attached to a back side of the steering wheel 10, aligning with a rim of the steering wheel 10 along its circumference. In an example, the force sensing resistor 110 is configured as a strip, attached to a front side of the steering wheel 10, aligning with a front rim of the steering wheel 10 along its circumference. In an example, the force sensing resistor 110 is configured as a strip, attached to an outer side of the steering wheel 10, aligning with an outer surface of the steering wheel 10. The strip of the force sensing resistor 110 is preferably attached to the steering wheel 10 using a Velcro, or an adhesive, without hampering the ability of the force sensing resistor 110 to record a pressure or grip of the driver on the steering wheel 10. Alternately, the force sensing resistor 110 is configured as a strip attached and/or embedded in only the upper hemisphere of the steering wheel representing a "wrap around" embodiment in which the force sensing resistor is present along at least portions of the entire outer surface of the upper hemisphere of the steering wheel.

Generally, force sensing resistors are designed as single-point force sensors, or in a matrix array form, allowing to capture pressure distribution over a given area. The strip form of the force sensing resistor 110 as shown in FIG. 3A and FIG. 3B is designed to maximize a surface area for detecting pressure, while also maintaining a low profile such that it does not interfere with the normal use or ergonomic comfort of the steering wheel 10. Such placement is particularly advantageous as this area is typically where hands (one hand shown, as represented by reference numeral 22) of the driver is in contact with (i.e., the hand 22 of the driver is placed on) and applies pressure while steering the vehicle. This ensures consistent contact of the force sensing resistor 110 with the hand 22 of the driver during operation of the vehicle, enabling the force sensing resistor 110 to reliably capture the force applied by the driver.

Also, as illustrated in FIGS. 1-2, the alert system 100 includes a galvanic skin response sensor 120 coupled to the steering wheel 10 of the vehicle. As used herein, the "galvanic skin response sensor 120" is defined as a component of the alert system 100, configured to measure an electrical conductance of the driver's skin. Galvanic skin response is known to be one of the most sensitive measures for an emotional arousal of a human, also referred to as Electrodermal activity or skin conductance. Galvanic skin response is measure of autonomic activation of sweat glands in the skin. The sweating on hands and feet is triggered by emotional stimulation. When the sweat glands are triggered and become more active, they secrete moisture through pores towards the skin surface. By changing the balance of positive and negative ions in the secreted fluid, electrical current flows more readily, resulting in measurable changes in skin conductance. This change in skin conductance is generally termed Galvanic Skin Response (GSR). It is to be noted that, whenever a person is emotionally aroused, the galvanic skin response (GSR) data shows distinctive patterns that are visible with bare eyes and that can be quantified statistically. The galvanic skin response sensor 120 operates based on the principle that skin conductance varies with the moisture level, which is influenced by the driver's autonomic nervous system in response to stress, excitement, or other emotional states. The galvanic skin response sensor 120 is configured to detect the physiological changes of the skin of the driver, such as, for example, stress or drowsy state of a driver reflects on the electrical properties on the skin of the driver's hand and/or fingers. When the driver experiences changes in emotional state or stress, the sweat glands are activated, altering the skin's moisture level and, consequently, its conductance. This variation in conductance is captured by the galvanic skin response sensor 120 and translated into electrical signals. In an embodiment of present disclosure, in the alert system 100, the galvanic skin response sensor 120 is coupled to the steering wheel 10 of the vehicle to ensure constant contact with the driver's skin. This configuration enables the galvanic skin response sensor 120 to continuously monitor the physiological state of the driver, providing conductance data for further analysis.

In a galvanic skin response sensor, skin conductivity is typically recorded non-invasively using two electrodes placed on the skin. Generally, galvanic skin response sensors have a small measurement site, such as, 1 cm². The two electrodes are typically connected to an amplifier to boost the measured signal, and a digitizer to transfer the recorded measurement to a digital signal to form a galvanic skin response sensor. This combination of elements is generally placed in either a reusable Snap-on Velcro straps or in a patch sticker. A voltage applied across the electrodes generates a current. The electrodes of a galvanic skin response sensor are typically made from a fine grain, homogeneous mixture of silver-silver chloride (Ag—AgCl) compressed and sintered for strength. Galvanic skin response sensors further contain wireless data transmission modules, for example, using the Bluetooth protocol, or a wired communication module for transmission of recorded conductance data. ring In an embodiment, the galvanic skin response sensor 120 is integrated into a pair of rings.

In an example, two electrodes forming a galvanic skin response sensor 120 are aligned along the interior circumference of the pair of rings, with one electrode in one ring. In an example, the two electrodes (galvanic skin response sensor 120) are present at least along a portion of an inner surface of the pair of rings. Additionally, an amplifier, a digitizer and a communication circuit are connected to the two electrodes in each of the pair of rings. In an example, two-tab electrodes in the shape of a ring (pair of rings) are used as galvanic skin response sensor 120. The pair of rings have a hollow interior and are expandable for the driver's fingers to be inserted into it. Generally, each of the pair of rings have a diameter in the range of 1.2 cm up to 3 cm. The pair of rings are attached to the steering wheel 10 of the vehicle. The pair of rings may be tied to an outer surface of the steering wheel. In an example, the pair of rings may be attached and/or embedded to an outer surface the steering wheel 10 along its circumference using a Velcro, or an adhesive, without hampering the ability of the Galvanic skin response sensor in the pair of rings to record the conductance of the driver's skin.

Figure 4A:
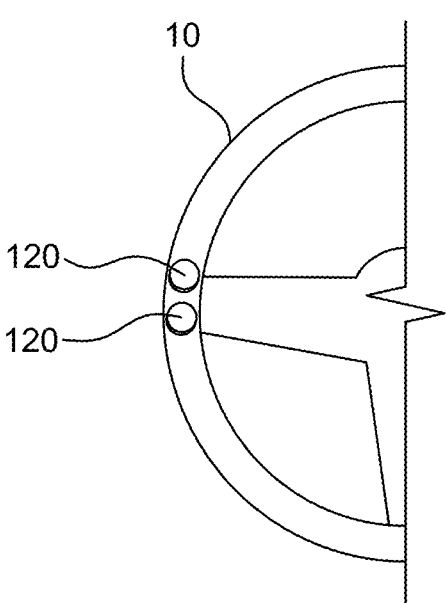
FIG. 4A is a partial diagrammatic view illustration of the steering wheel of the vehicle with a galvanic skin response sensor of the alert system integrated therewith, according to certain embodiments.
Figure 4B:
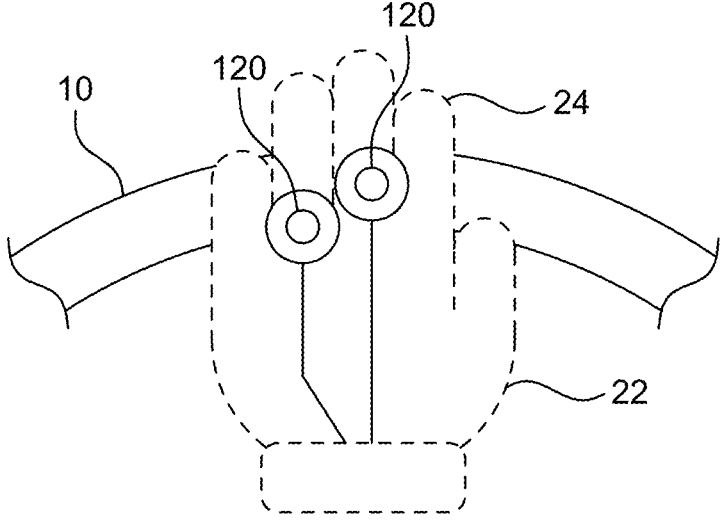
FIG. 4B is a depiction of implementation of the galvanic skin response sensor of the alert system in operation of the vehicle, according to certain embodiments.

Referring to FIGS. 4A and 4B in combination, as may be seen, the galvanic skin response sensor 120 is embodied as a pair of rings (also represented by same reference numeral 120). The pair of rings 120 are coupled to the steering wheel 10 of the vehicle in a manner that is both functional and unobtrusive. Herein, the pair of rings 120 is positioned to provide a contact with the driver's skin as the driver is in contact with the steering wheel 10. In the present examples, the pair of rings 120 is strategically positioned at the back of the rim of the steering wheel 10, to align with a natural resting position of the hand 22, and in particular fingers (as represented by reference numeral 24) of the driver during operation of the vehicle. Specifically, the pair of rings 120, embodying the galvanic skin response sensor 120, are formed as loops and coupled in a manner that the driver's fingers 24 are placed inside these rings 120 when holding the steering wheel 10. More specifically, the driver's fingers 24 typically curled around the steering wheel 10, make consistent contact with the pair of rings 120, allows for uninterrupted data collection. In an example, the pair of rings 120 may incorporate two-tab electrodes placed on inner sides, and may be placed such that the said two-tab electrodes are in contact with the fingers 24. Such positioning ensures constant contact between the driver's skin on the fingers and the galvanic skin response sensor 120, for accurate measurement of skin conductance changes.

It may be appreciated that although the present embodiments have been described in terms of the implementation of the galvanic skin response sensor 120 in the pair of rings form; in other example, the galvanic skin response sensor

120 may include only one ring, or may be implemented in some other form such as a depression in the steering wheel 10, or a contact point on the steering wheel 10, without departing from the spirit and the scope of the present disclosure.

In an alternate embodiment, the galvanic skin response sensor 120 is integrated into a smart watch (not shown). The integration of the galvanic skin response sensor 120 into the smart watch allows for continuous measurement of the conductance of the driver's skin on the wrist in a manner that is both non-intrusive and user-friendly. This placement is particularly advantageous as it does not depend on the driver's interaction with the vehicle's controls, thereby offering flexibility and ensuring continuous monitoring regardless of the driving style or position of the hands on the steering wheel 10. The galvanic skin response (GSR) 120 may be connected to an internal circuitry of the smart watch proximal to a base of the dial, such that with the base of the dial in contact with the driver's wrist, corresponds to the GSR 120 in contact with the driver's wrist (skin). It may be understood that the galvanic skin response sensor 120 integrated into the smart watch may transmit the collected data (i.e., the conductance data) wirelessly to processing systems of the alert system 100 for further processing (as discussed later in the description).

In an alternate embodiment, the galvanic skin response sensor is integrated into a console (galvanic skin response sensor 120') close to the driver's seat in the vehicle (not shown) in addition to the pair of rings (galvanic skin response sensor 120) coupled to the steering wheel 10 of the vehicle. The integration of the galvanic skin response sensor into the console (galvanic skin response sensor 120') close to the driver's seat includes embedding the two electrodes in an interior surface of a console of the vehicle, where a driver can rest their hand 22, without losing the ability of the galvanic skin response senor 120 to perform its required functionality. In an example, the galvanic skin response sensor 120' may be integrated into a second pairs of rings and placed on the console close to driver's seat. The integration of the galvanic skin response sensor 120' into the console of the vehicle allows for continuous measurement of the conductance of the driver's skin on the hands 22 in a manner that is both non-intrusive and user-friendly. The integration of the galvanic skin response sensor into the console (galvanic skin response sensor 120') close to the driver's seat and the pair of rings (galvanic skin response sensor 120) steering wheel 10 allows for continuous monitoring and measurement of the conductance of the driver's skin on the fingers 24 or on the palm (hand 22), regardless of the position of the hands of the driver, such as, for example, the driver may move hand 22 from the steering wheel 10 to a console for resting purposes. The driver might lose alertness and the hand may be in resting position on a console close to the driver's seat, in contact with the galvanic sensor 120' for uninterrupted data collection. This configuration enables the galvanic skin response sensor 120 and the galvanic skin response sensor 120' to continuously monitor the physiological state of the driver, providing conductance data for further analysis.

The integration of the force sensing resistor 110 and the galvanic skin response sensor 120 with the vehicle (directly or indirectly) enables the alert system 100 to provide a comprehensive, real-time monitoring solution. In the present embodiments, the driver is in contact with the force sensing resistor 110 and the galvanic skin response sensor 120. Herein, the integration of the force sensing resistor 110 into the steering wheel 10 of the vehicle allows it to continuously monitor force exerted by the driver on the steering wheel 10, providing real-time force data which serves as an indicator of the driver's physical engagement and potential fatigue levels. Further, the galvanic skin response sensor 120 enables the alert system 100 to directly measure the electrical conductance of the driver's skin, which is an effective metric for assessing physiological responses like stress or fatigue. The strategic placement of these components ensures that they remain in constant contact with the driver, providing continuous and accurate readings.

Referring back to FIGS. 1-2, additionally, the alert system 100 includes an alarm notification module 130 coupled to an interior console (not shown) of the vehicle. The alarm notification module 130 is configured to serve as an interface for conveying alerts and warnings generated by the alert system 100 to the driver of the vehicle. The alarm notification module 130 is designed for efficient communication and interaction with the driver. The alarm notification module 130 may be strategically positioned within the interior console of the vehicle for accessibility to the driver. This placement ensures that any alerts generated are immediately noticeable and can be acted upon without significant distraction from the driving task. In the present examples, the alarm notification module 130 is configured to issue various types of notifications, including auditory, visual, or haptic alerts, depending on the nature of the alert and the configuration of the alert system 100.

Figure 5:
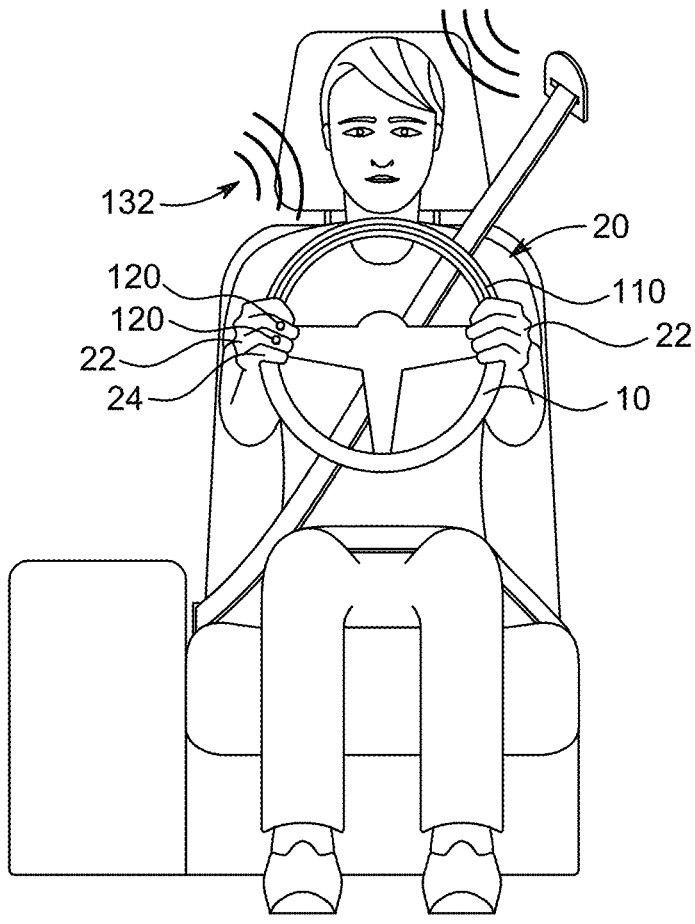
FIG. 5 is a depiction of implementation of the alert system for the driver of the vehicle, according to certain embodiments.

In an embodiment, the alarm notification module 130 comprises a sound producing element (generally shown in FIG. 5 and represented by reference numeral 132). The sound producing element 132 is configured to generate audible notifications for alerting the driver to various conditions that the alert system 100 detects as potential safety concern. In the present alert system 100, the sound producing element 132 within the alarm notification module 130 may be calibrated to produce alerts that are clear and easily discernible. This is done to ensure that the driver can hear and recognize these alerts, irrespective of background noise such as road sounds, conversations, or audio playback from the vehicle's entertainment system.

Herein, the activation of the alarm notification module 130 comprises generating an audible alarm from the sound producing element 132. That is, when the alert system 100 identifies a condition that necessitates driver awareness, based on the analyses of data from the force sensing resistor 110 and/or the galvanic skin response sensor 120 (as will be discussed later in detail), it activates the alarm notification module 130. This activation triggers the sound producing element 132 to generate the audible alarm. The nature of this alarm is carefully designed to be clear and distinct, to be easily understood even with the ambient noise within the vehicle, to capture the driver's attention.

Further, as illustrated in FIGS. 1-2, the alert system 100 includes a processing unit 140 coupled to the force sensing resistor 110 and coupled to the galvanic skin response sensor 120. The coupling of the processing unit 140 with the force sensing resistor 110 and the galvanic skin response sensor 120 ensures data transmission and synchronization therewith. This connection allows the processing unit 140 to receive continuous streams of data from both the force sensing resistor 110, which monitors the physical interaction of the driver with the steering wheel 10, and the galvanic skin response sensor 120, which tracks physiological responses indicative of the driver's alertness and emotional state. In an example embodiment, the processing unit 140 may be connected to either one of or both of the force sensing resistor 110 and the galvanic skin response sensor 120 through a wired communication module to receive recorded data. In an example embodiment, the processing unit 140 may be connected to either one of or both of the force sensing resistor 110 and the galvanic skin response sensor 120 through a wireless communication module to receive recorded data. In an example embodiment, one of the force sensing resistor 110 and the galvanic skin response sensor 120 may be connected to the processing unit through a wired communication module and one may be connected through a wireless communication module to receive recorded data.

Further, as shown, the processing unit 140 is connected to the alarm notification module 130 to provide an output for activation of and generation of the alert thereby. The processing unit 140 also includes a memory (not shown) to store various types of data. The processing unit 140 further includes circuitry (represented by reference numeral 142 in FIG. 1) with instructions to process data received from both the force sensing resistor 110 and the galvanic skin response sensor 120 to determine the driver's alertness state and activate the alarm notification module 130 based on predefined criteria, thereby alerting the driver to potential issues regarding their alertness or attention.

In particular, the circuitry 142 includes instructions to receive initial conductance data from the galvanic skin response sensor 120. The initial conductance data received by the circuitry 142 from the galvanic skin response sensor 120 forms a baseline against which subsequent conductance measurements may be compared. The initial conductance data allows the alert system 100 to assess changes in the driver's physiological state, such as stress or fatigue, which are indicators of alertness and attention. The ability of the processing unit 140 to receive and process this initial data enables the alert system 100 to establish a comprehensive understanding of the driver's normal physiological state. Once the initial conductance data is acquired, the circuitry 142 is also responsible for its storage in the memory for subsequent utilization in analysis.

Further, the circuitry 142 includes instructions to generate a mean data from the initial conductance data and store the mean data in the memory coupled to the circuitry 142. As discussed, the initial conductance data represents the electrical conductance of the driver's skin under normal, non-stressed conditions. In an example, the initial conductance data includes first 10-30 seconds of the conductance readings recorded as reference when the galvanic skin response sensor 120 is disposed in contact with the skin of the driver. Herein, the computation of the mean data involves aggregating these initial conductance readings over a specified period of 10-30 seconds and calculating their average. This averaging process helps in smoothing out any anomalies or outliers in the initial data, ensuring that the mean data serves as a reference point or baseline for the driver's normal physiological state, which may then be used for subsequent physiological assessments of the driver. This averaging process helps in smoothing out any initial data where a driver might be in stressed or excited emotional state. Once the mean data is calculated, the circuitry 142 proceeds to store this data in the memory that is coupled to it.

Further, the circuitry 142 includes instructions to receive real-time force data from the force sensing resistor 110. As discussed, the force sensing resistor 110, integrated into the steering wheel 10 of the vehicle, is configured to detect and measure the amount of force exerted by the driver. This force data is a direct indicator of the driver's engagement and grip on the steering wheel 10, which can vary based on their alertness and physical state. The circuitry 142 is programmed to continuously receive this real-time force data, ensuring that any changes in the driver's grip strength are immediately captured and processed. Herein, the real-time force data may also be stored in the memory associated with the processing unit 140, for further processing as required.

In the present disclosure, each of the real-time force data corresponds to a force exerted by the driver on the steering wheel 10 of the vehicle. That is, each instance of real-time force data corresponds directly to the amount of force exerted by the driver on the steering wheel 10 of the vehicle. This data provides a continuous and immediate indication of the driver's physical interaction with the steering wheel 10, which is utilized in assessing their alertness and engagement while driving. The real-time nature of this force data allows for detection of changes in the driver's grip strength, which can be indicative of fatigue, distraction, or a decrease in alertness. For instance, a gradual decrease in the force exerted on the steering wheel might suggest that the driver is becoming drowsy. This real-time force data is continuously transmitted to the processing unit 140 of the alert system 100, where it is analyzed in conjunction with the conductance data from the galvanic skin response sensor 120 (as discussed hereinafter).

Further, the circuitry 142 includes instructions to receive real-time conductance data from the galvanic skin response sensor 120. As discussed, the galvanic skin response sensor 120, coupled to the steering wheel 10 or integrated into a wearable device like a smart watch, measures the electrical conductance of the driver's skin. This conductance varies with the moisture level of the skin, which is influenced by the driver's autonomic nervous system response to stress, arousal, or emotional states. The circuitry 142 within the processing unit 140 is programmed to continuously receive this conductance data in real-time. This real-time conductance data allows the alert system 100 to capture and respond to rapid changes in the driver's physiological state.

Herein, each of the initial conductance data and the real-time conductance data measured by the galvanic skin response sensor corresponds to an electrical conductance of the driver's skin. It may be understood that both the initial conductance data and the real-time conductance data measured by the galvanic skin response sensor 120 are utilized for assessing the driver's physiological state. The initial conductance data represents the baseline electrical conductance of the driver's skin under normal, non-stressful conditions. This baseline is established to provide a reference point against which future conductance readings can be compared. The galvanic skin response sensor 120 measures this initial data when the driver first interacts with the alert system 100, typically at the start of a driving session. The real-time conductance data, on the other hand, is continuously measured during the operation of the vehicle. The real-time conductance data captures any changes in the electrical conductance of the driver's skin as they occur, providing a dynamic assessment of the driver's physiological state. Variations in the real-time conductance data from the initial baseline can be indicative of changes in the driver's stress levels, emotional states, or overall alertness.

Further, the circuitry 142 includes instructions to apply an averaging filter to the real-time conductance data to generate filtered real-time conductance data. As used herein, the "averaging filter" refers to a digital signal processing tool integrated within the circuitry 142 which operates by computing the average of successive data points over a specified time interval, thereby smoothing out rapid fluctuations in the real-time conductance data. In practical terms, the averaging filter takes the incoming stream of the real-time conductance data and calculates a running average. This process effectively reduces the impact of transient or minor changes in skin conductance that may not be indicative of substantial alterations in the driver's physiological state. The filtered real-time conductance data, once processed through the averaging filter, becomes a more stable and accurate representation of the driver's physiological condition over time. Thereby, the application of the averaging filter serves to refine the real-time conductance data, enhancing the accuracy and responsiveness of the alert system 100 in assessing the driver's physiological state.

Further, the circuitry 142 includes instructions to generate a first comparison between the real-time force data and a predefined threshold stored in the memory. This first comparison allows the alert system 100 to assess the driver's physical engagement with the vehicle and to detect potential deviations that could indicate decreased alertness or fatigue. In particular, the real-time force data, obtained from the force sensing resistor 110, may include continuous measurements of the force exerted by the driver on the steering wheel 10. This real-time force data is indicative of the driver's grip strength and engagement level with the vehicle's controls. The predefined threshold, as stored in the memory, serves as a benchmark for normal force exertion levels, established based on typical driving conditions and expected driver behavior. The circuitry 142 processes the real-time force data and conducts the first comparison to identify instances where the force exerted by the driver deviates significantly from the established norm. For instance, a substantial decrease in the force applied to the steering wheel 10 may suggest that the driver is experiencing fatigue or drowsiness.

Further, the circuitry 142 includes instructions to generate a second comparison between the real-time conductance data and the mean data stored in the memory. This second comparison, between the real-time conductance data, obtained from the galvanic skin response sensor 120, and the mean data that is stored in the memory (as discussed above), allows the alert system 100 to monitor the physiological state of the driver. The real-time conductance data represents the ongoing measurements of the driver's skin conductance, which is indicative of their physiological responses, such as stress or emotional arousal. The mean data, previously stored in the memory, serves as a baseline or reference point, representing the driver's normal conductance levels under non-stressed conditions. The circuitry 142 processes the real-time conductance data by comparing it against the stored mean data to detect significant deviations from the baseline, which could indicate changes in the driver's physiological state. For instance, a substantial increase in skin conductance compared to the mean data may suggest increased stress or arousal, potentially affecting the driver's ability to concentrate and react to road conditions.

Further, the circuitry 142 includes instructions to activate the alarm notification module 130 of the vehicle based on at least one of the first comparison and the second comparison. That is, within the alert system 100, the circuitry 142 is configured to govern the activation of the alarm notification module 130 based on the first comparison and/or the second comparison. These comparisons, as previously described, involve analyzing the real-time force data against the predefined threshold, and comparing the real-time conductance data with the mean data stored in the memory. In a first scenario, when the circuitry 142 executes the first comparison (i.e., the analysis of the force data from the force sensing resistor 110 against the predefined force threshold), it assesses whether the force exerted by the driver on the steering wheel 10 falls within expected parameters; and, for instance, if there is a substantial decrease in force data received from the force sensing resistor 110 that may indicate driver fatigue or distraction, in such case the alert system 100 responds by activating the alarm notification module 130, irrespective of the data from the galvanic skin response sensor 120. Similarly, in a second scenario, the second comparison involves the analysis of conductance data against the stored mean data, to determine whether there are significant changes in the driver's physiological state (as indicated by variations in skin conductance as received from the galvanic skin response sensor 120); and an increase or decrease beyond normal levels may suggest stress, emotional arousal, or other conditions affecting driver alertness, and in such case the alert system 100 again responds by activating the alarm notification module 130, irrespective of the data received from the force sensing resistor 110. Herein, the activation of the alarm notification module 130 may result in generation of the audible alarm (as discussed) to effectively capture the driver's attention and prompt appropriate corrective actions, thereby enhancing driving safety.

In present embodiments, the circuitry 142 of the processing unit 140 further includes instructions to activate the alarm notification module 130 when real-time force data is less than the predefined threshold in the first comparison. As discussed, the first comparison involves assessing the real-time force data against the predefined threshold, which represents a typical range of force that a driver would typically apply to the steering wheel under normal driving conditions. Now, if the circuitry 142 determines that the real-time force data falls below this predefined threshold, it indicates a potential reduction in the driver's grip strength or a lapse in engagement with the steering wheel 10. Such a scenario may arise due to various factors such as driver fatigue, drowsiness, or a momentary loss of focus, all of which can significantly compromise driving safety. In response to this detection, the circuitry 142, based on its programmed instructions, activates the alarm notification module 130 to issue an alert to the driver, drawing their attention to the potential risk and prompting immediate corrective action.

Similarly, in present embodiments, the circuitry 142 of the processing unit 140 further includes instructions to activate the alarm notification module 130 when a difference between the filtered real-time conductance data and the mean data is larger than a predefined difference value in the second comparison. As discussed, the second comparison evaluates the real-time physiological state of the driver. Herein, the predefined difference value is established based on typical conductance levels that a driver may exhibit under normal conditions. When the circuitry 142 identifies that the difference between the filtered conductance data and the mean data exceeds the predefined difference value, it signals a substantial alteration in the driver's physiological state, potentially indicating increased stress or emotional arousal. Upon identifying such substantial alteration, the circuitry 142, based on its programmed instructions, activates the alarm notification module 130 to issue an alert to the driver, drawing their attention to the potential risk and prompting immediate corrective action.

The present alert system 100 provides a comprehensive approach to monitoring driver alertness, using both physiological and physical data for a more accurate assessment. The integration of the force sensing resistor 110 into the steering wheel 10 provides real-time data on the force exerted by the driver. This physical data is a direct and immediate indicator of the driver's engagement with the vehicle, for assessing driver's attentiveness. Further, the integration of the galvanic skin response sensor 120, coupled to the steering wheel 10, measures the electrical conductance of the driver's skin. This physiological data is indicative of internal states of the driver, such as stress or fatigue, for assessing driver's alertness. By combining data from both physical and physiological sensors, the alert system 100 offers a nuanced view of the driver's state, thereby contributing significantly to the prevention of accidents caused by inattention or impaired alertness.

Referring to FIG. 5, illustrated is a depiction of implementation of the alert system 100 for a driver (as represented by reference numeral 20) of the vehicle. As illustrated, the driver 20 situated in a seat, with the hands 22 placed on the steering wheel 10, which is integrated with the force sensing resistor 110 and the galvanic skin response sensor 120. The force sensing resistor 110 is configured to capture force input from the hand(s) 22 indicative of grip strength from the driver 20, which is an indicator of physical engagement and a potential metric for driver alertness. Simultaneously, the galvanic skin response sensor 120 is configured to monitor electrical conductance variations from the fingers 24 in contact therewith, that may signal shifts in physiological state of the driver 20, such as stress or fatigue. The processing unit 140 (not shown in FIG. 5), including the circuitry 142, receives and processes the initial and real-time data from both the force sensing resistor 110 and the galvanic skin response sensor 120; applies the averaging filter to the conductance data to produce filtered real-time conductance data, which is used, along with the force data, to perform comparisons against predefined thresholds and mean data stored in the memory. These comparisons are the basis for activating the alarm notification module 130 (not shown in FIG. 5, but is understood to be coupled to the interior console of the vehicle, though the console itself is also not shown), which in turn generates the necessary alerts through the sound producing element 132 (generally represented by sound generated therefrom), to ensure attention and response from the driver 20, thereby enhancing the safety and responsiveness within the vehicle.

In the present embodiments, the alert system 100 may be configured to calibrate itself to the individual driver. During initial use, the alert system 100 records baseline conductance data and adjusts the force threshold according to the driver's typical grip strength. This calibration allows the alert system 100 to adapt to individual physiological and behavioral patterns, enhancing its accuracy and effectiveness.

In some embodiments, the alert system 100 may include a user interface (not shown) that allows drivers to customize settings according to their preferences. This user interface may be a part of the vehicle's infotainment system, enabling drivers to set thresholds for alerts, choose notification modalities, and review historical data. This level of customization ensures that the alert system 100 remains unobtrusive yet effective in its operation.

In some embodiments, the alert system 100 may be integrated with other vehicle systems to enhance overall safety. For example, in the event of a detected decrease in driver alertness, the alert system 100 may interface with the vehicle's navigation system to suggest a break or identify the nearest rest area. Additionally, the alert system 100 may be integrated with the vehicle's communication system to allow for automatic notifications to be sent to emergency contacts or fleet managers in critical situations.

Referring to FIG. 6, illustrated is a flowchart listing steps involved in a method 600 to alert the driver of the vehicle, according to certain embodiments. The method 600 encompasses a sequence of operations that work in conjunction to monitor and analyze various parameters indicative of the driver's state, and to provide timely notifications or warnings, as necessary. Various embodiments and variants disclosed above, with respect to the aforementioned alert system 100, apply to the present method 600.

In particular, at step 602, the method 600 includes measuring initial conductance data through the galvanic skin response sensor 120 in contact with the driver's skin for a period of 10-30 seconds. The galvanic skin response sensor 120 measures the electrical conductance at a baseline state. The initial conductance data collected by the galvanic skin response sensor 120 reflects the driver's physiological condition prior to and independent of potential stressors or distractions that may occur during driving. This baseline measurement establishes a reference against which the subsequent conductance readings may be compared. The capture of this initial conductance data allow to detect deviations, which may signify a change in the driver's alertness or stress levels, and to respond with appropriate alerting actions to maintain vehicle safety.

At step 604, the method 600 includes storing the initial conductance data in the processing unit 140 coupled to the galvanic skin response sensor 120. That is, the initial conductance data, once measured by the galvanic skin response sensor 120, is stored in the processing unit 140, or specifically the memory of the processing unit 140. The processing unit 140 serves as a repository for this data, preserving the integrity of the initial measurements for ongoing reference throughout the operation of the vehicle. In particular, this storage process captures the baseline physiological data of the driver, allowing for a comparative analysis as driving conditions evolve.

At step 606, the method 600 includes generating and storing a mean data from the initial conductance data using the processing unit 140. That is, following the acquisition and storage of initial conductance data, the processing unit 140 generates mean data for the initial conductance data. This mean data is calculated from the initial conductance data and represents the average baseline of the driver's skin conductance, serving as a standard for normal physiological conditions. The processing unit 140 then securely stores this mean data, to allow for continuous, real-time comparison with subsequent conductance readings.

At step 608, the method 600 includes measuring real-time force data corresponding to force exerted by the driver on the steering wheel 10 of the vehicle through the force sensing resistor 110 incorporated in the steering wheel 10 of the vehicle. Herein, the force sensing resistor 110, which is incorporated into the steering wheel 10 of the vehicle, is responsible for measuring real-time force data. This real-time force data corresponds to the force exerted by the driver on the steering wheel 10 as they interact with the vehicle controls during operation. The real-time force data provides a dynamic reflection of the driver's physical engagement and may be used for detecting any variations in driving behavior that could signal a loss of alertness or the onset of fatigue.

At step 610, the method 600 includes measuring real-time conductance data from the galvanic skin response sensor 120. That is, the method 600 further employs the galvanic skin response sensor 120 to measure the real-time conductance data, which is indicative of the driver's physiological state. This measurement is taken continuously while the driver is operating the vehicle, providing an ongoing assessment of physiological responses that may reflect stress, fatigue, or emotional arousal. The real-time conductance data, captured by the galvanic skin response sensor 120, may be utilized for detecting any immediate or evolving changes in the driver's state that may impact their capacity to safely control the vehicle.

At step 612, the method 600 includes applying an averaging filter to the real-time conductance data and generating filtered real-time conductance data using the processing unit 140. Herein, the processing unit 140 applies the averaging filter to the real-time conductance data collected by the galvanic skin response sensor 120, to refine the data by smoothing out transient spikes or dips that may not be relevant to the driver's overall physiological state. The averaging filter calculates a running mean over a set period, effectively filtering out noise and short-term fluctuations. The output of this process is the generation of the filtered real-time conductance data, which provides a more reliable and stable measure of the driver's physiological responses for subsequent analysis.

At step 614, the method 600 includes generating the first comparison between the real-time force data and a predefined threshold stored in the processing unit 140. Herein, the processing unit 140 generates the first comparison between the real-time force data, as measured by the force sensing resistor 110, and the predefined threshold that is stored within the processing unit 140. This predefined threshold represents a benchmark level of force that a driver is expected to exert on the steering wheel 10 under normal driving conditions. By comparing the real-time data against the predefined threshold, the processing unit 140 may determine whether the force exerted by the driver is within the expected range or if it falls below, potentially indicating a lapse in driver alertness or the onset of fatigue.

At step 616, the method 600 includes generating the second comparison between the real-time conductance data and the mean data stored in the processing unit 140. Herein, the processing unit 140 generates the second comparison which involves analyzing the real-time conductance data against the mean data previously stored in the processing unit 140. This mean data serves as a baseline, representing the driver's normal physiological state under typical, non-stressed conditions as measured by the galvanic skin response sensor 120. By comparing the real-time conductance data with the mean data, the processing unit 140 may detect any substantial changes in the driver's physiological state which may be indicative of stress, emotional arousal, or other physiological responses, and that may affect the driver's alertness and safe vehicle operation.

At step 618, the method 600 includes activating the alarm notification module 130 connected to the vehicle based on at least one of the first comparison and the second comparison. That is, the activation of the alarm notification module 130 is based on result of either the first comparison or the second comparison conducted by the processing unit 140. As discussed, the first comparison assesses the real-time force data against the predefined threshold, while the second comparison evaluates the real-time conductance data against the mean data. If either of these comparisons indicates a significant deviation, such as a decrease in force exerted on the steering wheel or a substantial change in skin conductance, it triggers the activation of the alarm notification module 130. It is to be noted that, the alarm notification module 130 may not receive any input from the processing unit 140 based on the first comparison or the second comparison, when no significant deviation is observed from the force sensing resistor 110 or the galvanic skin response sensor 120, indicating that the driver is alert. The alarm notification module 130, if activated, issues an alert to the driver, effectively communicating potential concerns regarding their alertness or physiological state, thereby prompting timely corrective action to ensure continued safe driving.

In some embodiments, activating the alarm notification module 130 based on the first comparison corresponds to real-time force data being less than the predefined threshold. That is, the activation of the alarm notification module 130 occurs when the real-time force data, as measured by the force sensing resistor 110, is determined to be less than the predefined threshold. Herein, the predefined threshold represents a standard level of force typically applied by the driver on the steering wheel 10 under normal driving conditions. When the processing unit 140 determines that the real-time force data falls below the predefined threshold, it interprets this as a potential indication of reduced grip strength or a lapse in the driver's engagement with the steering wheel 10. Responding to this, the processing unit 140 activates the alarm notification module 130 to alert the driver to the possible risk and prompting them to reassess their driving condition or take necessary actions to mitigate any safety concerns.

In some embodiments, activating the alarm notification module 130 based on the second comparison corresponds to a difference between the filtered real-time conductance data and the mean data being larger than the predefined difference value. That is, the activation of the alarm notification module 130 occurs when the difference between the filtered real-time conductance data, as processed by the averaging filter in the processing unit 140, and the stored mean data exceeds the predefined difference value. Herein, the predefined difference value is established within the processing unit 140 and serves as a benchmark to gauge significant changes in the driver's physiological state. When the processing unit 140 identifies that the difference between the filtered real-time conductance data and the mean data is greater than the predefined difference value, it indicates a substantial deviation from the driver's typical physiological state. Responding to this, the processing unit 140 activates the alarm notification module 130 to alert the driver about the detected change in their physiological condition, prompting them to take appropriate actions.

In some embodiments, the galvanic skin response sensor 120 is integrated into a pair of rings 120, wherein the pair of rings 120 are coupled to the steering wheel 10 of the vehicle. This positions the galvanic skin response sensor 120 in a manner that ensures consistent and direct contact with the driver's skin. When the driver grips the steering wheel 10, their fingers or palms come into contact with the pair of rings 120, to effectively measure variations in skin conductance, which can be indicative of changes in the driver's stress levels, emotional state, or overall alertness.

In some embodiments, measuring each of the initial conductance data and the real-time conductance data using the galvanic skin response sensor 120 corresponds to an electrical conductance of the driver's skin. Herein, the initial conductance data, measured by the galvanic skin response sensor 120, establishes the baseline electrical conductance of the driver's skin under typical, non-stressful conditions, to be used as a reference point for all subsequent measurements. Conversely, the real-time conductance data, also measured by the galvanic skin response sensor 120, reflects ongoing changes in the skin's electrical conductance, which may be attributed to various factors such as stress, emotional arousal, or fatigue, and may directly impact the driver's ability to safely operate the vehicle. By continuously measuring both the initial conductance data and the real-time conductance data, the galvanic skin response sensor 120 provides a comprehensive view of the driver's physiological responses over time, to detect and respond to significant changes that may affect driving safety.

In some embodiments, the activation of the alarm notification module 130 comprises generating the audible alarm from the sound producing element 132 of the alarm notification module 130. Herein, the sound producing element 132 may be configured to emit audible signals that are distinct and easily recognizable within the vehicle's cabin. This ensures that the driver can quickly identify the alarm and understand that it signifies an important notification. The nature and tone of the audible alarm are designed to be effective in capturing the driver's attention. This ensures that the driver is promptly and effectively informed of issues, such as deviations in physiological or physical data, enabling them to take immediate corrective action to maintain safety.

In some examples, the processing unit 140 may be an Arduino UNO board. The key components of the hardware for the alert system 100 may include a Vernier sensor interface shield, a Qubit galvanic skin response sensor (serving as the galvanic skin response sensor 120), an FSR-408 sensor (serving as the force sensing resistor 110), an alarm component (part of the alarm notification module 130), and a power source. The Vernier sensor interface shield is used with the galvanic skin response sensor 120 connected to analog pin A0, the force sensing resistor connected to analog pin A2, and the alarm component connected to digital pin D12.

This setup facilitates the simultaneous real-time reading of both conductance and force data. Meanwhile, the acquired data are further processed by a software program, in this example, MATLAB, to execute algorithms specifically designed for the present purposes. These algorithms involve commands and calculations that commence by recording 10 seconds of conductance data from the galvanic skin response sensor 120, which is used as a reference for the driver's active state. The mean of this data is then calculated and stored in the memory of the processing unit 140, representing the active conductance value of the driver using the alert system 100.

Subsequently, the alert system 100, as per the present example, begins monitoring the conductance data from the galvanic skin response sensor 120 and the force data from the force sensing resistor 110 in real time. The conductance signal undergoes processing using a moving average filter, and the resulting values are compared point by point to the stored mean data. The difference between these values is then calculated and compared to the predefined threshold, in this example, set at 0.3, indicating a deviation of data by 30%. This difference is indicative of the driver's state, distinguishing between active and drowsy conditions. When the calculated difference exceeds the predefined threshold, i.e., difference is 30% or more, indicating driver drowsiness, the alarm notification module 130 is activated to issue the alert. Furthermore, in this example, when the driver's hands are removed from the steering wheel 10, another alert is activated by the alarm notification module 130.

In the present disclosure, the driver's state is determined based on the difference between the real-time data and the reference data. Specifically, when the real-time force data or real-time conductance data deviates from corresponding reference (predefined threshold or mean data) by 30% or more, it is indicative of a drowsy driver. In this context, 0.3 is used to represent a 30% deviation. The data are maintained in their original form and not converted to percentage form, hence the use of the value 0.3.

To ensure accurate results from the alert system 100, the driver may need to adhere to specific instructions before using the alert system 100. These include ensuring that the hands and wrists are dry before contact with the galvanic skin response sensor 120, and avoiding the use of the alert system 100 when physically or emotionally exhausted, as this can affect the sensor's readings. In cases where the driver's condition may vary significantly, the alert system 100 may be adapted to store a single reference data set for an individual driver under normal conditions. This data may be recorded in the alert system 100 and used continuously for comparisons.

The design of the alert system 100 incorporates four distinct states for alarms: First, when both the galvanic skin response sensor 120 and the force sensing resistor 110 indicate normal data, no alarm is activated. Second, if the driver removes a hand from the steering wheel 10 while the conductance data is normal, the alarm is activated. Third, if the driver's conductance data indicates a drowsy state while the force data does not, the alarm is activated. The alarm may be the same for each instance or there might be multiple alarms available, for example, a specific tone may indicate a sudden decrease in force exerted on the steering wheel 10, suggesting driver fatigue, while a different tone may signal a substantial change in skin conductance, indicating stress or emotional arousal. Finally, if the driver's hands are removed from the steering wheel 10 and the conductance data indicates a drowsy state, the alarm is activated. In this instance, if more than one alarm is included in the alarm notification module 130, both the alarms are activated simultaneously.

The alert system 100 and the method 600 of the present disclosure offer several advantages over existing vehicular safety systems. Herein, the integration of physiological data through the galvanic skin response sensor 120 provides a more nuanced and earlier detection of changes in the driver's state, potentially identifying fatigue or inattention before it manifests in driving behavior. This early detection is crucial for preventing accidents, especially in situations where driver engagement is critical. Also, the physical data from the force sensing resistor 110 offers a comprehensive assessment of the driver's alertness. This dual approach mitigates the limitations of known systems that rely solely on behavioral observations, thereby enhancing overall safety. Further, the ability of the alert system 100 to process and analyze data in real-time, coupled with its immediate feedback mechanism through the alarm notification module 130, ensures that drivers are promptly alerted to potential safety issues, allowing for quick corrective actions. Furthermore, by calibrating to individual drivers, the alert system 100 provides personalized monitoring, increasing its reliability and effectiveness in detecting inattention or fatigue. This adaptability is particularly advantageous in vehicles used by multiple drivers, as it ensures consistent performance across different users. Moreover, with the potential for integration with wearable technology (like smartwatch), the alert system 100 may be adapted for use in semi-autonomous or autonomous vehicles, where driver engagement may vary significantly, providing an additional layer of safety.

Figure 7:
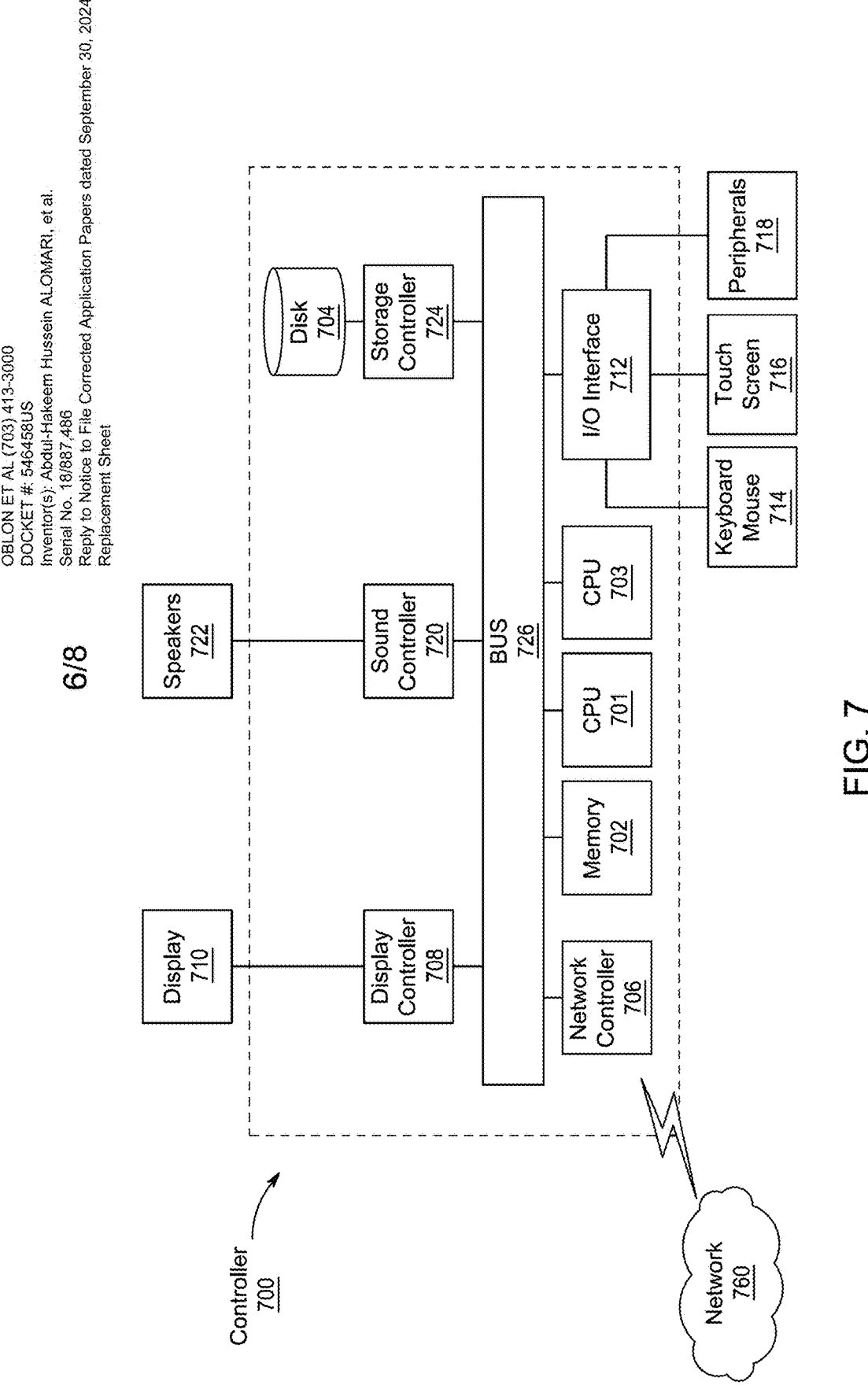
FIG. 7 is an illustration of a non-limiting example of details of computing hardware used in a circuitry of a processing unit of the alert system, according to certain embodiments.

In the present disclosure, details of the hardware description of the processing circuitry according to exemplary embodiments are described with reference to FIG. 7. In FIG. 7, a controller 700 (as depicted) is representative of the processing circuitry in which the controller 700 is a computing device which includes a CPU 701 and optionally a CPU 703 which performs the processes described above/ below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows, UNIX, Solaris, LINUX, Apple MAC-OS, and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN subnetworks. The network 760 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general-purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
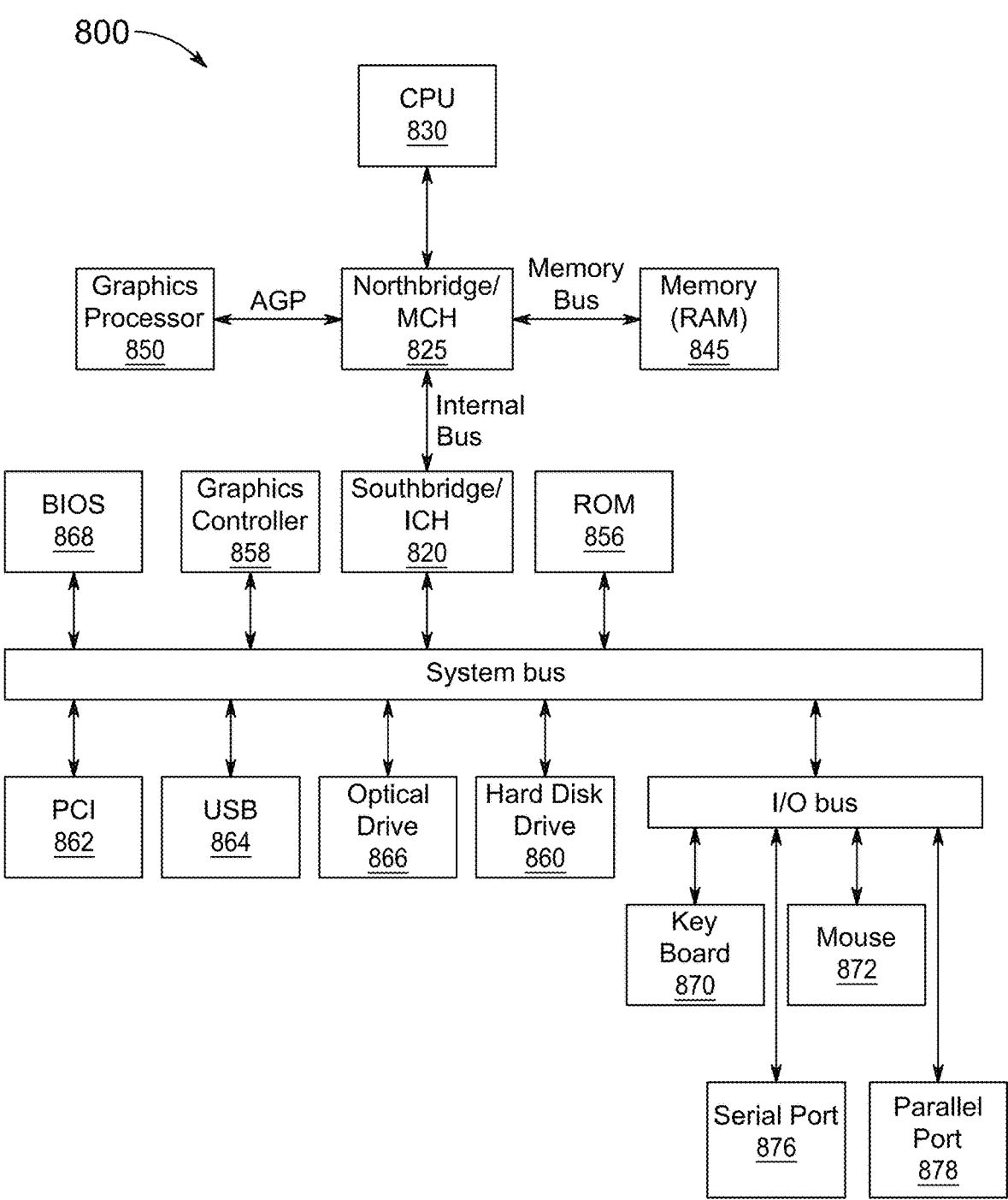
FIG. 8 is an exemplary schematic diagram of a data processing system used within the circuitry of the processing unit of the alert system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and may even be implemented using one or more heterogeneous processor systems.

Figure 9:
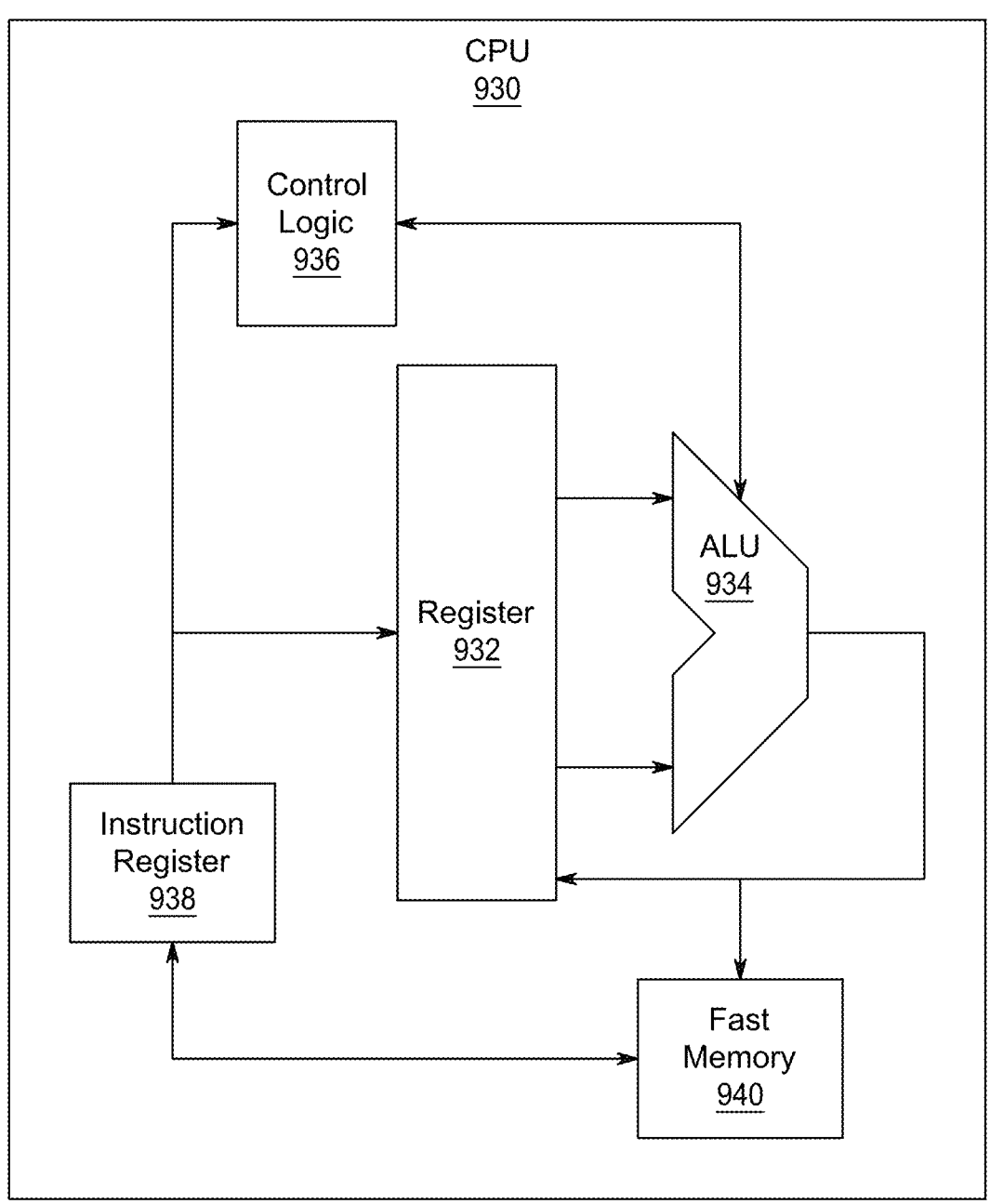
FIG. 9 is an exemplary schematic diagram of a processor used with the circuitry of the processing unit of the alert system, according to certain embodiments.

For example, FIG. 9 shows one implementation of CPU 930. In one implementation, the instruction register 938 retrieves instructions from the fast memory 940. At least part of these instructions is fetched from the instruction register 938 by the control logic 936 and interpreted according to the instruction set architecture of the CPU 930. Part of the instructions can also be directed to the register 932. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus.

Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. An alert system for a driver of a vehicle, comprising:
   a force sensing resistor attached to a steering wheel of the vehicle;
   a galvanic skin response sensor coupled to the steering wheel of the vehicle;
   an alarm notification module coupled to an interior console of the vehicle; and
   a processing unit coupled to the force sensing resistor and coupled to the galvanic skin response sensor, wherein the processing unit comprises a circuitry including instructions to:
   receive initial conductance data from the galvanic skin response sensor;
   generate a mean data from the initial conductance data and store the mean data in a memory coupled to the circuitry;
   receive real-time force data from the force sensing resistor;
   receive real-time conductance data from the galvanic skin response sensor;
   apply an averaging filter to the real-time conductance data to generate filtered real-time conductance data;
   generate a first comparison between the real-time force data and a predefined threshold stored in the memory;
   generate a second comparison between the filtered real-time conductance data and the mean data stored in the memory; and
   activate the alarm notification module of the vehicle based on at least one of the first comparison and the second comparison.

2. The alert system of claim 1, wherein the circuitry of the processing unit further includes instructions to activate the alarm notification module when real-time force data is less than the predefined threshold in the first comparison.

3. The alert system of claim 1, wherein the circuitry of the processing unit further includes instructions to activate the alarm notification module when a difference between the filtered real-time conductance data and the mean data is larger than a predefined difference value in the second comparison.

4. The alert system of claim 1, wherein the driver is in contact with the force sensing resistor and the galvanic skin response sensor.

5. The alert system of claim 1, wherein the galvanic skin response sensor is integrated into a pair of rings, wherein the pair of rings are attached to the steering wheel of the vehicle.

6. The alert system of claim 5, wherein the pair of rings is positioned to provide a contact with the driver's skin as the driver is in contact with the steering wheel.

7. The alert system of claim 1, wherein the galvanic skin response sensor is integrated into an internal circuitry of a smart watch.

8. The alert system of claim 1, wherein the alarm notification module comprises a sound producing element.

9. The alert system of claim 8, wherein the activation of the alarm notification module comprises generating an audible alarm from the sound producing element.

10. The alert system of claim 1, wherein each of the real-time force data corresponds to a force exerted by the driver on the steering wheel of the vehicle.

11. The alert system of claim 1, wherein each of the initial conductance data and the real-time conductance data measured by the galvanic skin response sensor corresponds to an electrical conductance of the driver's skin.

12. A method to alert a driver of a vehicle, comprising:
   measuring initial conductance data through a galvanic skin response sensor in contact with the driver's skin;
   storing the initial conductance data in a processing unit coupled to the galvanic skin response sensor;
   generating and storing a mean data from the initial conductance data using the processing unit;
   measuring real-time force data corresponding to force exerted by the driver on a steering wheel of the vehicle through a force sensing resistor attached to the steering wheel of the vehicle;
   measuring real-time conductance data from the galvanic skin response sensor;
   applying an averaging filter to the real-time conductance data and generating filtered real-time conductance data using the processing unit;
   generating a first comparison between the real-time force data and a predefined threshold stored in the processing unit;
   generating a second comparison between the filtered real-time conductance data and the mean data stored in the processing unit; and
   activating an alarm notification module connected to the vehicle based on at least one of the first comparison and the second comparison.

13. The method of claim 12, wherein activating the alarm notification module based on the first comparison corresponds to real-time force data being less than the predefined threshold.

14. The method of claim 12, wherein activating the alarm notification module based on the second comparison corresponds to a difference between the filtered real-time conductance data and the mean data being larger than a predefined difference value.

15. The method of claim 12, wherein the galvanic skin response sensor is integrated into a pair of rings, wherein the pair of rings are coupled to the steering wheel of the vehicle.

16. The method of claim 12, wherein measuring each of the initial conductance data and the real-time conductance data using the galvanic skin response sensor corresponds to an electrical conductance of the driver's skin.

17. The method of claim 12, wherein an activation of the alarm notification module comprises generating an audible alarm from a sound producing element of the alarm notification module.

* * * * *